US012362464B2

(12) United States Patent
Koh et al.

(10) Patent No.: US 12,362,464 B2
(45) Date of Patent: Jul. 15, 2025

(54) HOLSTER WITH EMBEDDED COUPLING ELEMENT FOR EXTENDING RADIO ANTENNA RANGE

(71) Applicant: MOTOROLA SOLUTIONS, INC., Chicago, IL (US)

(72) Inventors: Ming Yeh Koh, Bdr Baru Air Itam (MY); Alexander Oon, Bayan Lepas (MY); Bing Qin Lim, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 164 days.

(21) Appl. No.: 18/172,410

(22) Filed: Feb. 22, 2023

(65) Prior Publication Data

US 2024/0283139 A1 Aug. 22, 2024

(51) Int. Cl.

*H01Q 1/24* (2006.01)
*A45F 5/02* (2006.01)
*H01Q 1/14* (2006.01)
*H01Q 1/27* (2006.01)
*H01Q 1/48* (2006.01)

(52) U.S. Cl.

CPC ............ *H01Q 1/273* (2013.01); *A45F 5/021* (2013.01); *H01Q 1/14* (2013.01); *H01Q 1/48* (2013.01)

(58) Field of Classification Search

CPC .. H01Q 1/14; H01Q 1/24; H01Q 1/27; H01Q 1/273; H01Q 1/48; A45F 5/00; A45F 5/02; A45F 5/021

See application file for complete search history.

(56) References Cited

U.S. PATENT DOCUMENTS

| | | | | |
|---|---|---|---|---|
| 3,523,296 A | | 8/1970 | Vliegenthardt | |
| 4,485,946 A | * | 12/1984 | Liautaud | A45F 5/021 224/678 |
| 6,348,897 B1 | * | 2/2002 | Alameh | H01Q 5/378 343/702 |
| 7,796,089 B2 | | 9/2010 | Zwick et al. | |
| 7,812,771 B2 | * | 10/2010 | Greene | H01Q 9/0407 343/702 |
| 8,350,695 B2 | | 1/2013 | Loen | |
| 8,462,069 B2 | * | 6/2013 | Tesh | H01Q 1/46 343/792 |
| 9,363,794 B1 | * | 6/2016 | Oon | H01Q 5/335 |
| 9,503,558 B1 | | 11/2016 | Krishnamurthi et al. | |
| 9,653,785 B2 | | 5/2017 | Vance | |
| 10,158,385 B1 | * | 12/2018 | Patel | A45F 5/02 |

(Continued)

FOREIGN PATENT DOCUMENTS

KR 100809274 B1 3/2008

*Primary Examiner* — Tho G Phan

(74) *Attorney, Agent, or Firm* — Barbara R Doutre

(57) ABSTRACT

A holster for docking a portable radio is provided. The holster is configured with a GND extension path that provides an antenna counterpoise for an external antenna of the portable radio. The holster is formed of a housing (121) having a belt attachment element (122) extending therefrom and a GND contact (124) integrated into therein, the a GND contact for coupling to a corresponding radio GND of the docked radio. The GND extension path extends from GND contact (124) through a first conductive element (126) of the holster housing to a second conductive element (128) embedded in the belt attachment element of the holster.

11 Claims, 7 Drawing Sheets

(56) References Cited

U.S. PATENT DOCUMENTS

| | | | | |
|---|---|---|---|---|
| 10,374,311 | B2 * | 8/2019 | Faraone | H01Q 5/371 |
| 2006/0022822 | A1 * | 2/2006 | Wong | A45F 5/02<br>340/568.1 |

* cited by examiner

HOLSTER WITH EMBEDDED COUPLING ELEMENT FOR EXTENDING RADIO ANTENNA RANGE

FIELD OF DISCLOSURE

The present disclosure relates generally to holsters for electronic devices and more particularly to antenna performance of a body worn holstered portable radio.

BACKGROUND OF THE INVENTION

Police officers, security companies, emergency rescue personnel, and other public safety personnel often utilize a portable radio for communications. Such portable radios typically use an external antenna and operate over a land mobile radio (LMR) system. External portable radio antennas come in different lengths, with the best antenna performance typically being achieved with a longer antenna. Efficiency performance of portable radios in handheld mode and holstered mode can vary greatly, particularly in the case of radios having long external antennas which may become detuned when worn in the holstered mode. Additionally, users of LMR continue to request smaller radio form factors, which presents further challenges to antenna matching and providing sufficient electrical ground (GND) for holstered radio antenna performance. The ability to maintain talk range communications remains paramount, and to this end, continued improvements in technology relating to portable radio antenna performance are desired.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
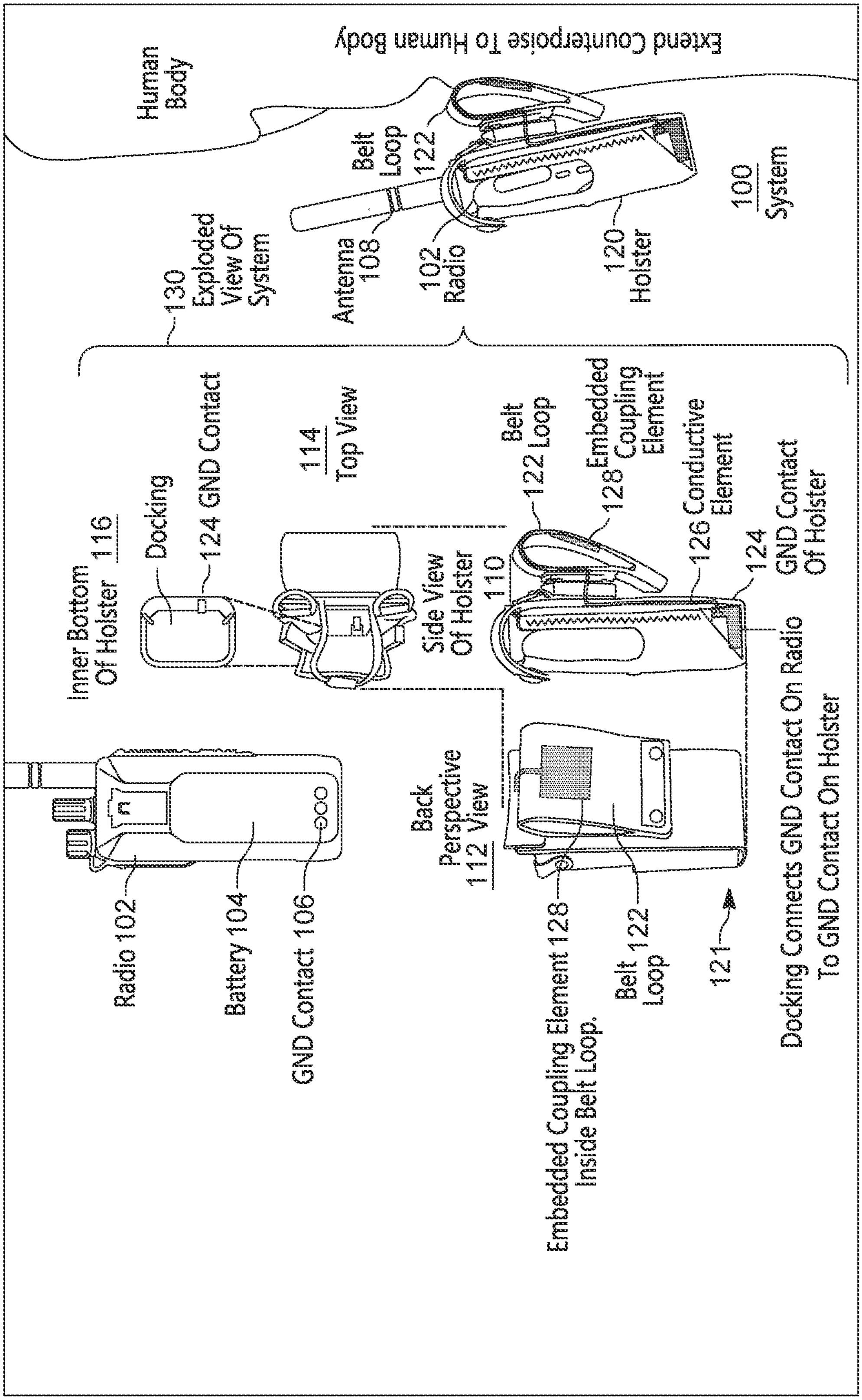
FIG. 1 shows a holster system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an improved holster for a portable radio having an external antenna. The holster is provided with an embedded coupling element for extending the antenna range of the portable radio when the portable radio is carried in the holster. For the purposes of this application, the portable radio is considered to be a land mobile radio (LMR) operating within an LMR communication system. The LMR communication system provides person-to-person voice communication widely used by public safety and first responder organizations such as law enforcement, fire, and ambulance agencies, and other organizations, services or agencies. The LMR communication system is half-duplex, with multiple portable radios sharing a single radio channel, so only one portable radio can transmit at a time. The portable radio is normally in a receiving mode so the user can hear other radios (a talkgroup) on the channel. When a user wants to talk, for example in a talkgroup call, the user presses a push-to-talk (PTT) button on the portable radio, which turns on the transmitter of the portable radio. The LMR communication system includes various network elements that assist in facilitating communication between portable radios, such as base stations, servers, dispatch consoles, data applications, and RF conventional or trunked sites. The portable radio operating within the LMR communication system comprises a two-way radio receiver and transmitter, controller, and audio circuitry.

The embodiments and examples described herein have been provided in terms of an improved holster, particularly well suited for a VHF portable radio, where such radios typically have physically long external antennas, as compared to the external antenna of UHF or 8/900 MHz radios. For example, for VHF a longer quarter wavelength of about 551 mm may be used, as compared to UHF of about 186 mm and 8/900 MHz of about 93 mm. Thus a VHF radio typically uses a longer external antenna. However it is to be appreciated that the improved holster may also be used in UHF and/or 8/900 MHz portable land mobile radio applications. For example, the improved holster may be used in UHF and/or 8/900 MHz portable radios that have smaller form factors.

A VHF portable radio typically operates using an external antenna, often referred to as a whip antenna, having an electrical length of a quarter wavelength (¼λ). The quarter wavelength external whip antenna may be, for example, approximately 55 centimeters (cm) in physical length for high band portable radio frequency ranges (136-174 MHz). For best antenna efficiency, the portable radio chassis alone (GND) would ideally be at least a quarter wavelength to provide sufficient antenna counterpoise length to the external antenna. As mentioned previously, users of LMR continue to request smaller radio form factors, while maintaining talk range, and achieving the quarter wavelength electrical length within the portable radio chassis alone is not practical due to space and weight constraints associated with the radio form factor. Maintaining a desired talk range is based on a predetermined antenna radiated efficiency.

Operationally, at handheld positions, the portable radio couples to the human body via the user's hand, thus utilizing the human body as part of the antenna counterpoise length. The human body acts as a counterpoise extension for the antenna ground return. The counterpoise extension operates as a substitute for an earth (ground) connection as part of the radio antenna system. Utilizing the human body as GND for antenna counterpoise when the user holds the radio provides an appropriate quarter wavelength counterpoise. However, when the portable radio is carried in a holster, the distance and tilting angle between radio body and human body tends to reduce the ability for the human body to act as the counterpoise extension for the antenna ground return, thereby resulting in narrower frequency bandwidth coverage, poorer reflection coefficient (S11), and poorer antenna radiated efficiency. Thus, talk range may be negatively impacted when the portable radio is worn in a holster at the waist. For example, a portable VHF radio having a talk range of 6.9-7.2 kilometers when operated in a handheld position might be degraded to 2.6-2.8 kilometers when carried in a holster due to the negative impact (due to resulting shorter or insufficient antenna counterpoise) of the holster on the antenna efficiency, when the holster is worn.

The embodiments described herein provide for an improved holster which includes an appropriate counterpoise extension integrated therein for improved antenna efficiency.

FIG. 1 shows a holster system 100 formed and operating in accordance with some embodiments. The holster system 100 comprises a holster 120 comprising a housing 121 configured for docking a portable radio 102 having an external antenna 108. The portable radio 102 includes at least one exposed GND contact 106. The GND contact 106 of the portable radio 102 may be a battery GND contact of the portable radio, a dedicated GND contact of the portable radio, or a conductive chassis GND of the portable radio that is internally coupled to the portable radio GND. For the purposes of this application, the use of the term GND refers to the electrical ground (GND) signal of the electronic circuit inside the radio.

In accordance with the embodiments, the holster housing 121 includes a GND extension path integrated therein. The GND extension path of the holster couples to the portable radio GND contact 106 and extends the portable radio GND to a belt attachment element 122 extending from the holster housing 121. The GND extension path provides an antenna counterpoise for the external antenna 108 of the portable radio 102 when the portable radio is holstered and worn by a user.

An exploded view 130 of holster system 100 shows the portable radio 102 removed from the holster 120, along with various example views of the holster housing 121 including, a cutaway side view 110, a back perspective view 112, a top view 114, and an inner bottom view 116 for docking. In accordance with some embodiments, the GND extension path provided by the holster is formed by a GND contact 124 coupled to the holster housing, a first conductive element 126 having first and second ends, the first end of the conductive element being coupled to the GND contact 124, and a second conductive element 128 embedded in the belt attachment element 122, the second conductive element being coupled to the second end of the first conductive element. The GND contact 124 of the housing 121 is configured to align with the radio GND via one of: a battery GND contact of the portable radio, a dedicated GND contact of the portable radio; or a conductive chassis GND of the portable radio that is internally coupled to a portable radio GND. In some embodiments, the first conductive element 126 may comprise a plurality of conductive mechanical interconnects, (for example, metal connector, metal screw, metal nuts, metal ring holder) that are interconnected to couple the GND contact 124 to second conductive element 128.

The antenna counterpoise GND extension connection path of the holster 120 enables the portable radio to couple to the human body, thus utilizing the human body as part of the antenna counterpoise (extend total antenna counterpoise length). The human body extends the counterpoise extension for the antenna ground return when the portable radio is carried in the holster. The holster 120 is purposely configured to provide for predetermined distance and tilting angles between radio body and human body to avoid detuning the external antenna 108 while providing an appropriate frequency bandwidth coverage and satisfactory reflection coefficient (S11).

The first conductive element 126 may be formed, for example, of a conductive wire element, or a conductive strip on a substrate. For example, a wire may be mounted or integrated along a wall of the holster and/or conductive metal tape, metal strips, or the like, may be mounted or adhered or mounted to a substrate of the holster. Suitable substrates may include but are not limited to, PCB substrate, flex substrate, and/or wall substrate of the holster.

The second conductive element 128 may be formed, for example, of a conductive patch element of a predetermined surface area, wherein the predetermined surface area is determined based on GND current needed to form sufficient antenna counterpoise extension to achieve a predetermined antenna radiated efficiency for desired talk range of the portable radio. For example, a conductive patch element of a predetermined surface area may be integrated within the belt attachment element 122.

In some example applications, the conductive patch element may be configured as a square thin metal piece of, for example, 20 mm×20 mm, a rectangle metal piece or a circle metal piece of 400 $mm^2$ area. The more antenna GND current required to be coupled to the human body (the more antenna counterpoise extension coupling required) in order to achieve higher antenna efficiency, the bigger the surface area needed for the second conductive element 128 (higher coupling to the human body). In one example, the coupling mechanism of second conductive patch element 128 to the human body may be via capacitive coupling, wherein the impedance between second conductive patch element 128 and human body is designed to be low impedance at the operating frequency of the portable radio, by adjusting to the predetermined surface area (the bigger the surface area, the higher the capacitive coupling and the higher antenna GND current coupled to the human body). For example, the surface area needed can be calculated via the following formula, $$C=K*Eo*A/D, \text{ where}$$

Eo is the permittivity with value $8.854\times10^{-12}$,

K is the dielectric constant of the material (for example, air),

A is the surface area of the second conductive element 128, in $m^2$,

D is the distance between the second conductive element 128 and human body, in meters, and C is capacitance required to achieve a low impedance path from second conductive element 128 to human body, at operating frequency of the portable radio.

Capacitance is inversely proportional to impedance and operating frequency (C=1/(2πfX), where f=operating frequency and X=impedance), but proportional to surface area. Thus, the higher the operating frequency, the higher capacitance needed, and thus the bigger the surface area needed for the second conductive element 128. Also, the higher antenna GND current coupling needed, the lower impedance needed at the operating frequency, thus the bigger the surface area needed for the second conductive element 128, and vice versa.

In one example, the first conductive element 126 may be designed to have a predetermined length to provide a certain inductance to form a low impedance coupling path at operating frequency to the human body when connected in series to the second conductive element 128 that is capacitive, for example, based on series inductance capacitance resonance frequency formula, $$f = 1/\left[2\pi(LC)^{1/2}\right],$$

where f is the operating frequency of portable radio,

L is the inductance of the first conductive element 126, and

C is the capacitance of the second conductive element 128 to the human body.

In another example, if the first conductive element 126 is a metal wire, the inductance can be calculated based on formula, $$L = 2l\{In[(2l/d)(1+x)] - x + u/4 + d/21\},$$

$$\text{wherein } x = \left[1 + (d/21)2\right]^{1/2},$$

d is the diameter of the first conductive element 126, l is the length of the first conductive element 126, u is the permeability of the first conductive element 126, L is the inductance of the first conductive element 126, which can be calculated and used to determine the required capacitive coupling for second conductive element 128 when they are connected in series, as discussed above.

Placement and sizing of the second conductive element 128 within the belt attachment element may be configured to maximize coupling to the human body for sufficient GND return for acceptable antenna efficiency levels, while maintaining appropriate radiation absorption protections for the user.

The belt attachment element 122 may be, for example, a belt loop or a belt clip having a first portion adjacent to the holster housing and a second portion that sits adjacent to the user's body. In some holster configurations, the first conductive element may be configured to extend from GND contact 124 to the first portion of the belt attachment element, and the second conductive element may be embedded within an outer portion of the belt attachment element (as shown in FIG. 1). In other configurations, the second conductive element 128 may be embedded within the inner portion of the belt attachment element adjacent to the holster housing. The belt attachment element 122 may further be formed of a predetermined thickness for setting a predetermined distance between the second conductive element 128 and a human body when the holster is worn by a user.

The antenna counterpoise GND extension connection path provided by holster 120 may further be enabled and disabled by a switch. For example, an electronic RF switch can be controlled electronically by a general purpose input output (GPIO) controlled by a microcontroller located in one of: the portable radio or the battery of the portable radio. Various predetermined radio operational parameters may be used to detect when the radio docked within the holster 120 may benefit from the antenna counterpoise GND extension connection path and triggering of the switch. For example, the extended GND path may be switched on in response to one or more of: receive signal strength indicator (for example, RSSI of the LMR receiver of the portable radio) detected lower than a predetermined threshold; location data of the portable radio indicating a communication distance exceeding a communication distance threshold to another radio (for example, GPS data indicate the portable radio is having more than 4 KM distance to another portable radio, thus the switch is turned on to extend the GND counterpoise for further communication talk range); portable radio operating in direct radio to radio mode (without repeater or trunking); external antenna type insufficient for predetermined communication talk range (for example, when a shorter stubby external antenna is used, the communication talk range is shorter, thus the switch will be turned on to enabler longer communication talk range); presence of accessory coupling, such as a remote speaker microphone (RSM) not being connected to the radio (for example, turn off the switch so that not to extend GND counterpoise when a RSM is connected to the radio); radio in receive mode (for example, switch on the GND counterpoise extension when radio is detected in receive mode); radio assignment to an incident type that requires longer communication range (for example, radio automatically switch on the GND counterpoise extension when radio is assigned with Computer Aided Dispatch (CAD) incident electronic ticket of wildfire incident that need longer communication range, and automatically switch off the GND counterpoise extension when radio is assigned with CAD incident electronic ticket of local incident that does not need longer communication range); and/or radio configured for a pager mode of operation.

Figure 2:
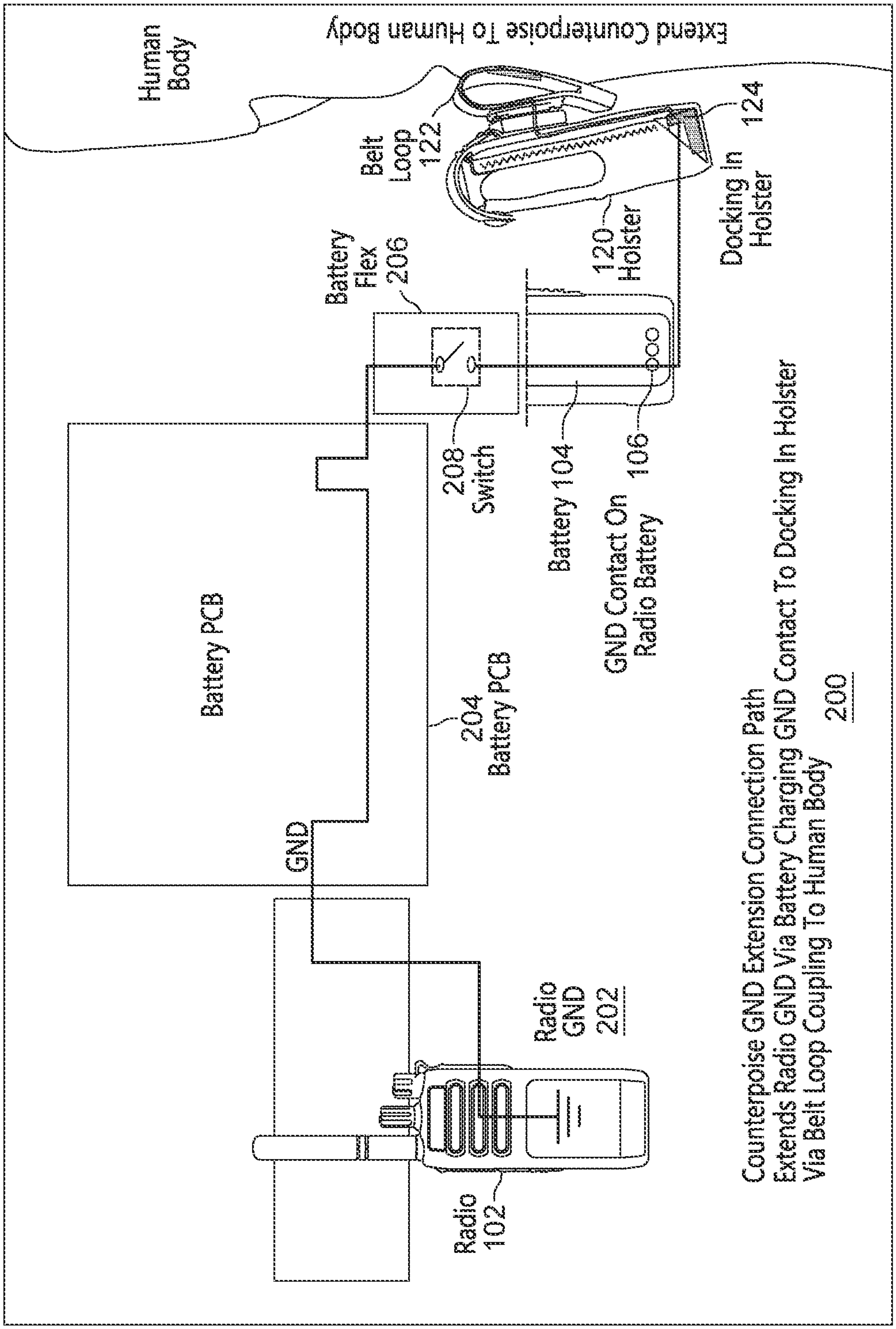
FIG. 2 shows a block diagram of the holster providing an extended GND path from a battery contact of a portable radio and through the holster in accordance with some embodiments.

FIG. 2 shows a block diagram 200 of holster 120 providing the extended GND path through a battery GND contact of the portable radio 102 in accordance with some embodiments. In this example, portable radio 102 is a portable land mobile radio (LMR) and the external antenna of the portable radio is a quarter wavelength external antenna. In this example, portable radio 102 includes an internal radio GND 202 which is coupled to GND on a printed circuit board (PCB) 204 of the battery 104 (other electronics for the battery/battery pack not shown). The radio GND 202 couples to GND contact 106 of battery 104. When the portable radio 102 is docked within holster 120, the GND contact 106 of the battery 104 aligns and couples to the corresponding GND contact 124 located in the lower docking portion of the holster. The GND contact 124 of the holster, first conductive element 126 extending along a vertical length of the holster, and second conductive element 128 embedded in the belt attachment element 122 form the antenna GND extension path for the external antenna 108 of the portable radio when the portable radio is holstered and worn by a user. The second conductive element 128 of the antenna GND extension path allows the human body to act as a counterpoise extension for the antenna GND return. Utilizing the human body as GND for antenna counterpoise extension when the radio is holstered to the user provides an appropriate quarter wavelength counterpoise for the external antenna 108. The antenna GND extension path integrated within the holster thus enables appropriate frequency bandwidth coverage, improved reflection coefficient (S11), and improved antenna radiated efficiency, as will be discussed later in further detail with supporting data.

In this embodiment, the GND extension path is controlled by a switch 208. For example, the battery PCB 204 may further include a flex extending therefrom having the switch 208 integrated thereon. The switch 208 enables the antenna GND extension path to be switched to couple to radio GND 202 and thus into the GND path of the external antenna 108. The path may be switched in or out depending on different operational parameters of the portable radio. For example, a VHF portable radio may include a sensor (for example, hall sensor to magnetically sense the presence of holster integrated with a magnet element) or other detection means for determining that the radio has been holstered and that improved antenna efficiency is desirable for the holstered mode of operation. The switch 208 may be automatically triggered to switch in the antenna GND extension path upon docking of the portable radio 102 into the holster 120. Other radio operating parameters may also be used as a basis for switching in the extended GND path of the holster 120, as previously described. While shown at battery flex 206, the switch 208 may be located within the portable radio 102 or the battery PCB 204.

The block diagram of FIG. 2 may further be summarized as a method for extending talk range of a portable land mobile radio (LMR) by first docking a portable radio (having external quarter wavelength antenna) into a holster; followed by enabling, in response to docking the portable radio, a GND connection that couples a GND of the portable radio to a corresponding GND contact of the holster, and then extending the GND connection via an extended GND path formed of a first conductive element embedded in the holster through to a second conductive element embedded in a belt attachment element of the holster. The extended GND path may be configured for a quarter wavelength antenna counterpoise when the holstered portable radio is worn by a user. The extended GND path may be switchably enabled based on predetermined radio operating parameters, as described previously including but not limited to: receive signal strength, location data, direct radio to radio mode, external antenna type, accessory detection; and/or radio operating mode.

Figure 3A:
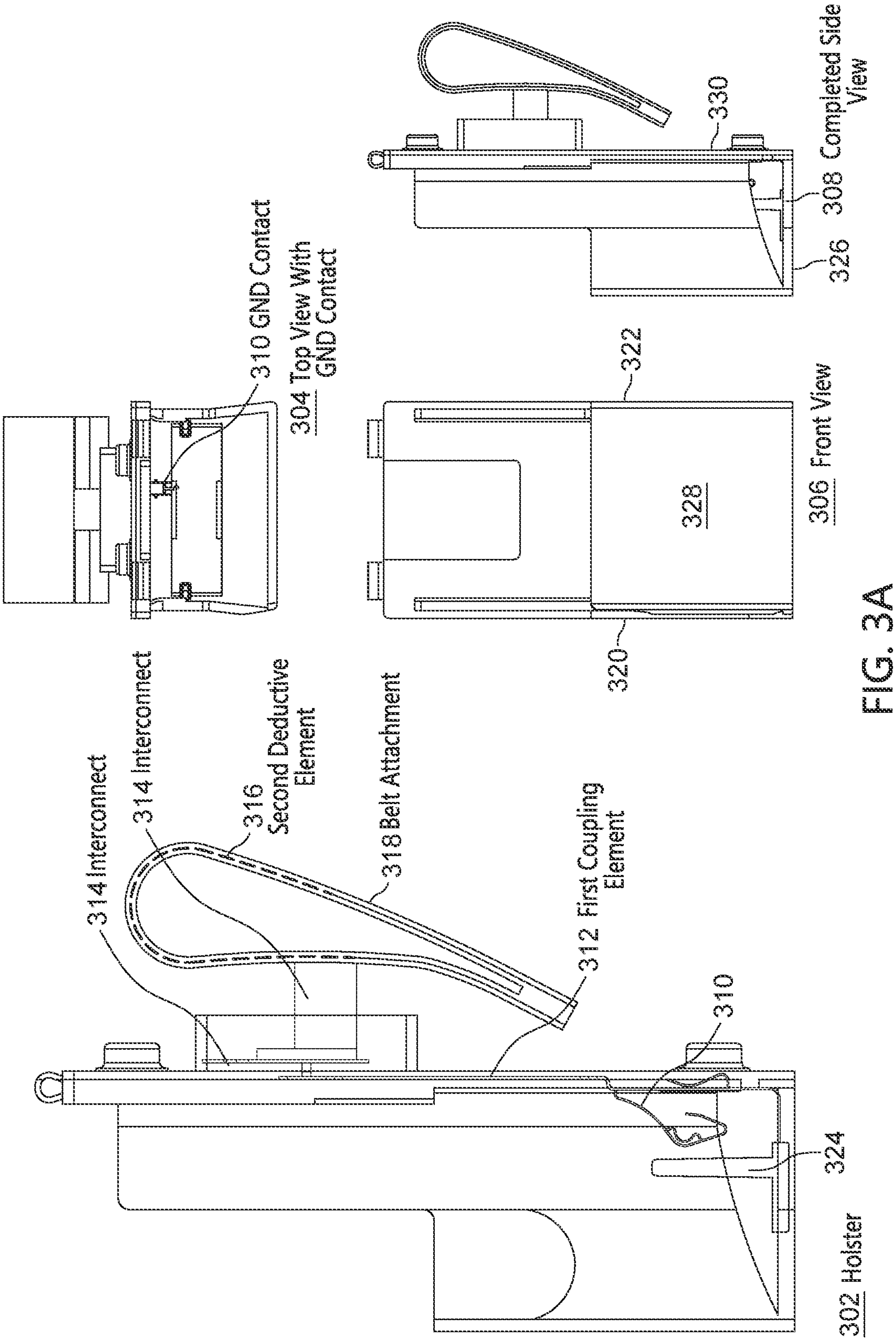
FIG. 3A shows various cutaway views of the holster in accordance with some embodiments.
Figure 3B:
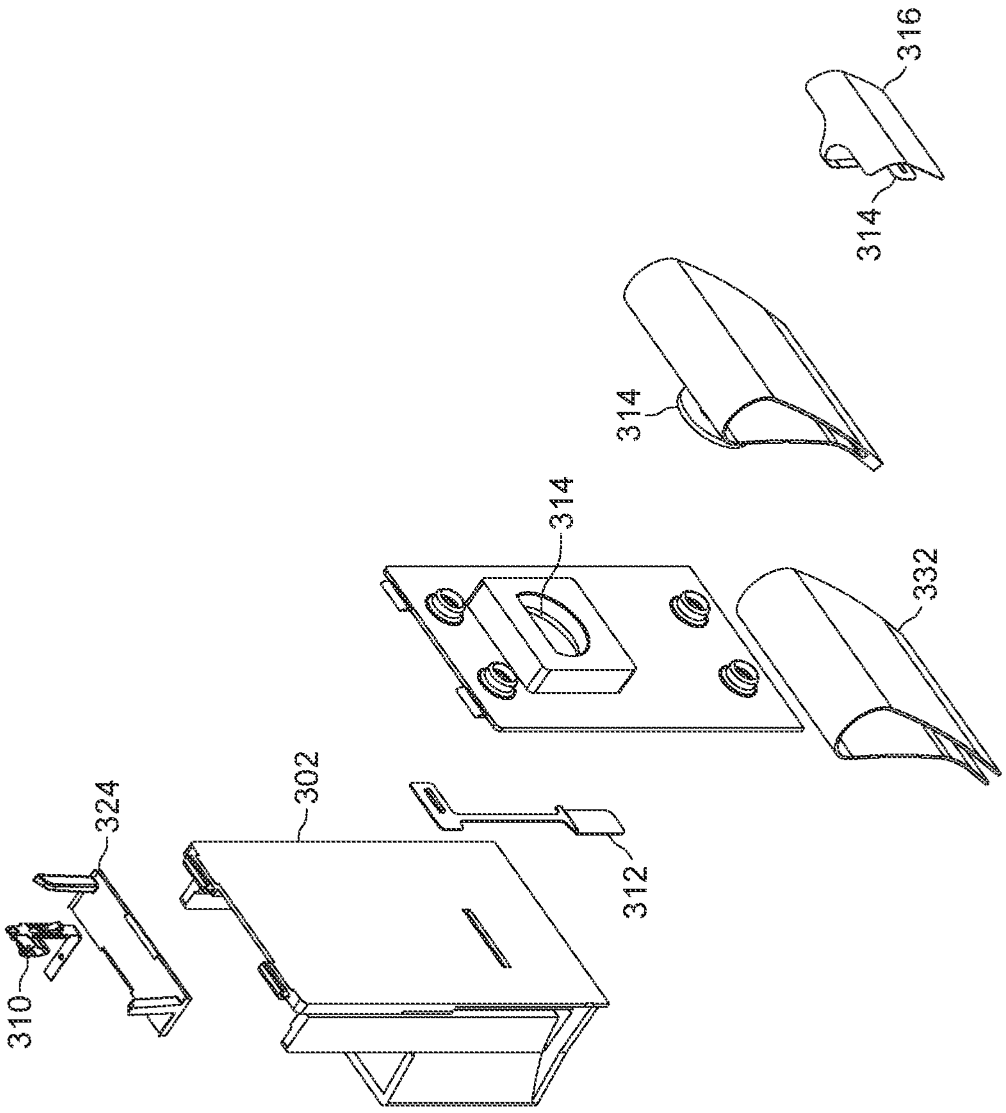
FIG. 3B shows an exploded view of the holster in accordance with some embodiments.

FIG. 3A shows various cutaway views of a holster having a GND extension path formed therein in accordance with some embodiments. FIG. 3B shows an exploded view of the holster 302 in accordance with some embodiments. Referring to the views of FIG. 3A, holster 302 is shown as a housing having a top view 304, a front view 306, and a side view 308. The GND extension path of holster 302 includes GND contact 310, first conductive element 312 and second conductive element 316, the second conductive element being located in belt attachment 318. The holster 302 includes first and second side walls 320, 322, a bottom wall 326 having docking elements 324 for docking a radio, a front wall 328, and a back wall 330. The docking elements 324 may include alignment featured, retaining featured or the like.

The configuration of the GND extension path may vary depending on the location of GND contact on the radio. In this example, the holster 302 is configured to dock the radio upon bottom wall 326 between first and second sidewalls 320, 322 and front and back walls 328, 330 thereby aligning the radio GND contact with GND contact 310 located on back wall 330 and coupling the radio GND to the GND extension path. The GND contact 310 is coupled to coupled the first conductive element 312, and the first conductive element 312 attaches to an interconnect 314 to couple to the second conductive element 316 thereby completing the GND extension path of the holster 302.

FIG. 3B shows an exploded view of the holster in accordance with some embodiments. In this view the GND contact 310, first conductive element 312, second conductive element 316, docking elements 324, and belt loop cover 332 are shown removed from the holster 302. The GND contact 310, first conductive element 312, interconnect 314 and second conductive element 316 are metal. A first end of the first conductive element 312 couples to the GND contact 310, and a second end of the first conductive element 312 couples to the interconnect 314. The interconnect 314 couples to the second conductive element 316 of the belt loop to complete the GND extension path of the holster 302.

Figure 4:
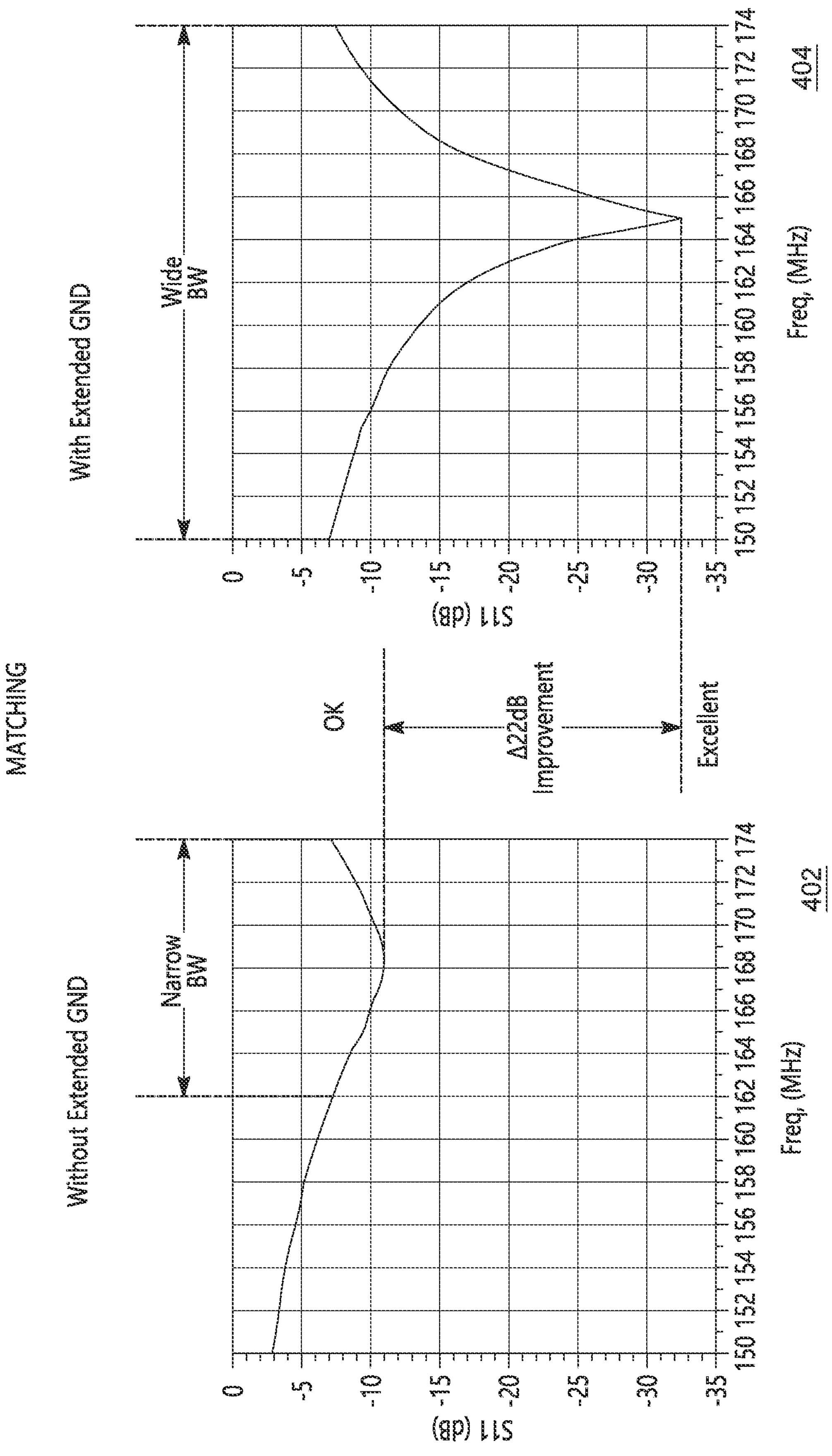
FIG. 4 shows a graphical comparison of antenna reflection coefficient, S11, with and without the extended GND of the holster in accordance with some embodiments.
Figure 5:
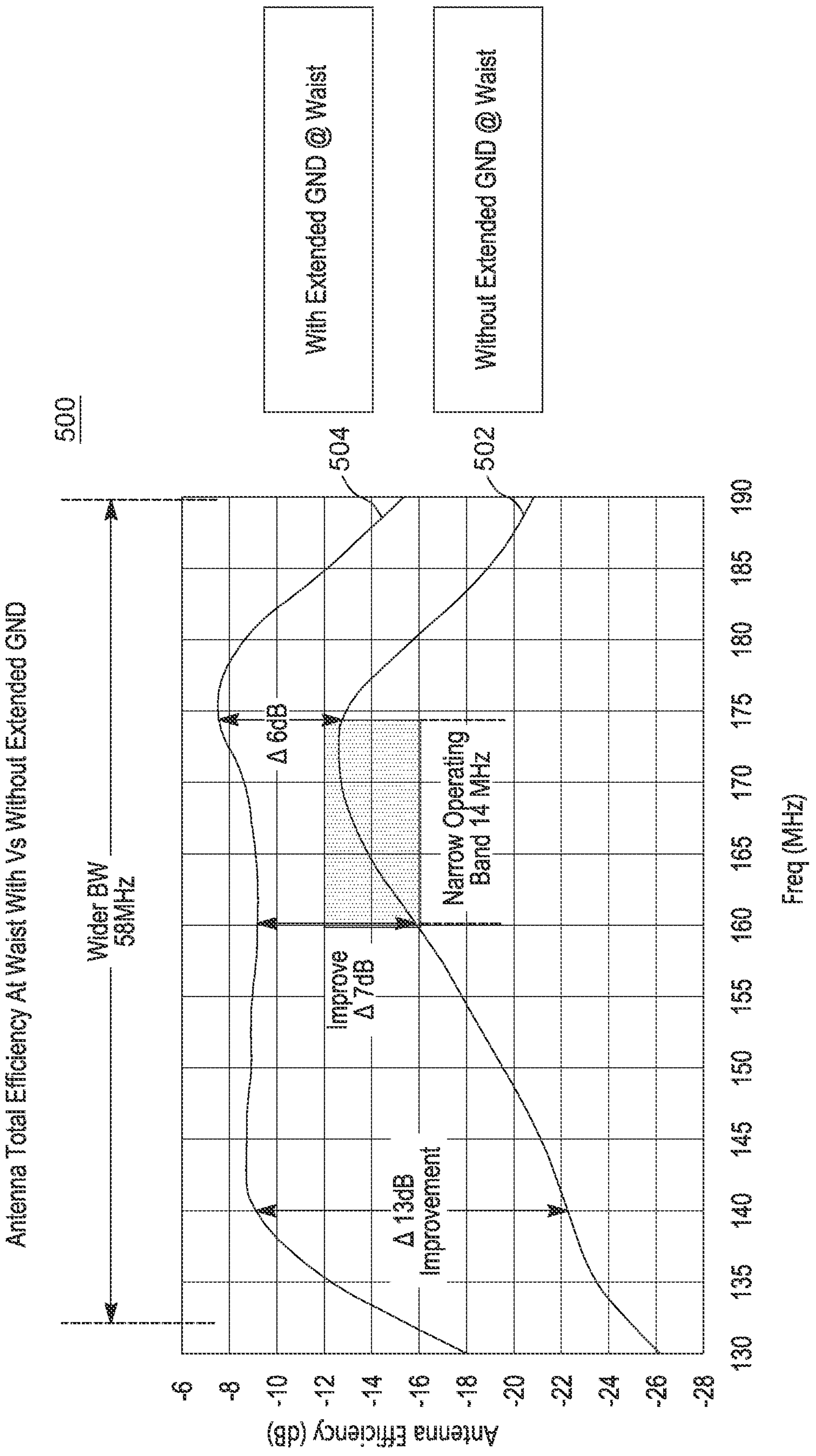
FIG. 5 shows a graphical comparison of antenna efficiency with and without the extended GND of the holster in accordance with some embodiments.
Figure 6:
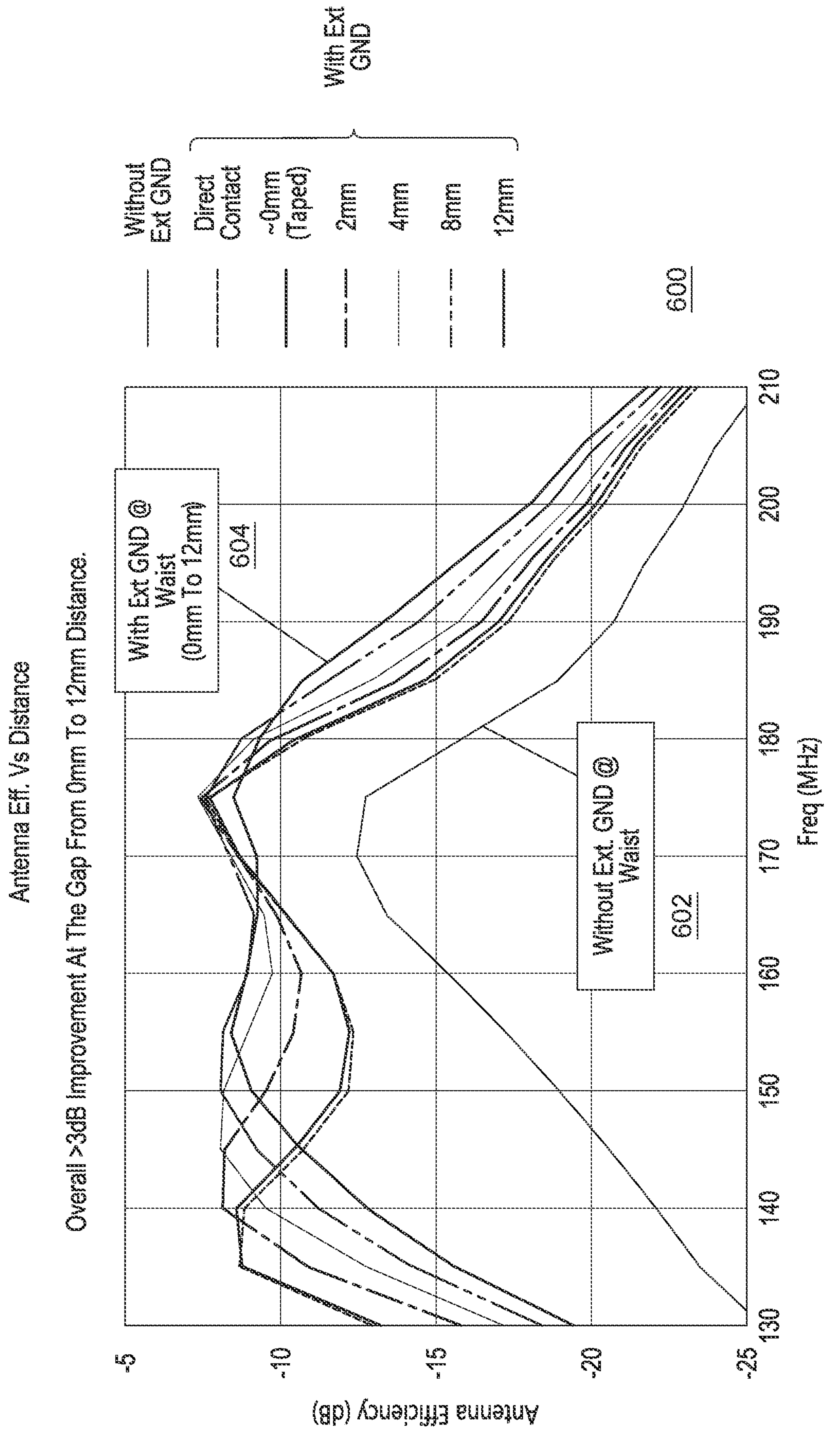
FIG. 6 shows a graphical comparison of antenna efficiency versus distance from the holster in accordance with some embodiments.

FIGS. 4, 5, and 6 show various measurement results and test data for a holster configured in accordance with the embodiments. Lab measurements were conducted with the radio in a waist mounted holster (with and without the extended GND path) on a user human body for FIG. 4, and using a phantom/proxy body for FIGS. 5 and 6. The configuration of first conductive element was implemented using a metal wire of 23 centimeters long and a second conductive element formed of a patch having 30 mm width× 35 mm height, forming 1050 $mm^2$ surface area. The first conductive element 126 implemented is a metal tape of 23 cm in length, based on the required length to connect and extend the GND contact of holster 120 that is located at the bottom of the holster to the second conductive element 128 that is located at the internal portion of belt attachment element 122. The inductance of this metal wire is calculated based on formula, $$L = 2l\{In[(2l/d)(1+x)] - x + u/4 + d/21\},$$

$$x = [1 + (d/21)2]^{1/2},$$

d is the diameter of the first conductive element 126, which is 1 mm, l is the length of the first conductive element 126, which is 23 cm, u is the permeability of the first conductive element 126, which is 1.0.

L is the inductance of the first conductive element 126, which is calculated as about 280 nH.

In order to achieve a low impedance path between GND contact of holster 120 and the human body at LMR VHF talkgroup operating frequency of about 170 MHz, the required capacitance of the second conductive element 128 is calculated, based on prior discussed formula, $f=1/[2\pi(LC)^{1/2}]$, wherein in this example, f is the operating frequency of portable radio, 170 MHz L is the inductance of the first conductive element 126, which is 280 nH as calculated above, and C is the required capacitance of the second conductive element 128 to the human body, and calculated as about 3.1 pF.

As mentioned in the previous paragraph, the second conductive element is designed based on formula C=K*Eo*A/D, to provide capacitive coupling of 3.1 pF that is calculated above, wherein in this example, Eo is the permittivity with value 8.854×10-12, K is the dielectric constant of air, which is 1, A is the required surface area of the second conductive element 128, which is 1050 $mm^2$, d is the distance between the second conductive element 128 and human body, which is 3 mm, and C is the resulting capacitance of value 2.1 pF provided by the second conductive element 128 that is required to provide the low impedance path when connected in series with the first conductive element 126 that has 280 nH inductance.

In some application examples, the length of the first conductive element and the dimensions of the second conductive element may be adjusted or fine tuned to adjust the impedance (to increase the impedance or reduce the impedance), based on the tested reflection coefficient S11 result or tested antenna radiated efficiency result. The higher the impedance, the lower antenna GND current will be conducting through the antenna counterpoise extension path and thus the lower resulting antenna efficiency result, and vice versa.

In some applications, a filtering circuit (for example, a band pass filter, a low pass filter, or a high pass filter) can be added (for example, LC filtering, ferrite bead) at any point along the antenna GND extension path, to provide selective filtering to a predetermined frequency (for example, to only allow GND current of operating frequency to pass through the filter, or to reject and suppress undesired radiation of a certain frequency). In some applications, more than one filtering circuit may be used (for example, in battery flex 206), and the switch 208 can be controlled via GPIOs (general purpose input outputs) to select which filtering circuit to connect to, based on the different radio operating conditions (such as, based on radio talkgroup frequency selected).

In some applications, the holster may be configured with more than one pair of first and second conductive elements residing therein (with more than one GND contact 106) operatively connected to the switch 208. Switch 208 may then be controlled via a GPIO to select which pair of first and second conductive elements (and which GND contact 106) to connect to, based on the radio operating condition or type of radio holstered. For example, if a VHF radio is holstered, a first pair of first and second conductive elements may be coupled; while if a UHF radio is holstered, a second pair of first and second conductive elements may be coupled. The different pairs of first and second conductive elements may be configured with different dimensions. For example, a different length for first conductive element 126 and a different surface area for second conductive element 128 may be used that are suitable for different radio operating conditions (for example, suitable for different frequency bands, suitable for a different required amount of antenna GND current).

FIG. 4 shows a graphical comparison of antenna matching (reflection coefficient or return loss, S11) to the radio transceiver with and without the extended GND path of the holster in accordance with some embodiments. Measurements 402, 404 illustrate frequency along a horizontal axis and reflection coefficient S11 (dB) along a vertical axis. Lab measurements were taken with the radio in a waist mounted holster (with and without the extended GND path) on a user human body.

Measurement 402 was taken with the radio docked in a waist mounted holster without the extended GND path. Measurement 404 was taken with the radio docked in a waist mounted holster, formed in accordance with the embodiments, with the extended GND path. The S11 reading indicates the amount of reflected power by the antenna as compared to the injected power to the antenna. In other words, a lower value of S11 indicates a lower reflected power by the antenna, and thus, the more power is absorbed by the antenna and radiated to the air (lower S11 indicates better antenna radiated efficiency). As seen by comparing measurement 402 and measurement 404, the antenna bandwidth frequency range is significantly wider (the frequency range having S11 result lower than threshold of −7 dB is 24 MHz for measurement 404, as compared to 12 MHz for measurement 402) with the holster having the extended GND path and the return loss improved by over 20 dB.

FIG. 5 shows a graphical comparison of antenna efficiency with and without the extended GND path of the holster in accordance with some embodiments. This measurement was taken using a quarter wavelength VHF antenna attached to the portable radio while the portable radio was docked in the holster at the waist. Graph 500 illustrates frequency along a horizontal axis and total efficiency (dB) along a vertical axis. Lab measurements were taken with the radio in a waist mounted holster (with and without the extended GND path) on a phantom/proxy body. Measurement 502 was taken with the radio in a waist mounted holster without the extended GND path. Measurement 504 was taken with the radio docked in a waist mounted holster, formed in accordance with the embodiments, with the extended GND path. As shown in graph 500, antenna total efficiency improves (higher in dB value) and bandwidth becomes wider (wider frequency range achieved above a threshold of −16 dB antenna total efficiency) when the radio is docked within the holster having the extended GND path configuration.

FIG. 6 shows a graphical comparison of antenna efficiency over distance from the holster in accordance with some embodiments. This measurement was taken using a quarter wavelength VHF antenna attached to the portable radio while the portable radio was docked in the holster at the waist. Graph 600 illustrates frequency along a horizontal axis and total efficiency (dB) along a vertical axis. Measurement 602 was taken with the radio docked in a waist mounted holster without the extended GND path. Measurements 604 were taken with the radio docked in a waist mounted holster, formed in accordance with the embodiments, with the extended GND path. Lab measurements 604 were taken at various distances between the second conductive element 128 and phantom/proxy body. Although different distance from the second conductive element 128 to the body will cause some variations to the antenna efficiency, the measurements 604 indicate an overall 3 dB improvement for a gap from 0 mm to 12 mm distance.

Accordingly, there has been provided an improved holster for a portable radio, the holster including a GND extension path integrated therein. The GND extension path couples to the portable radio GND and extends the portable radio GND to a belt attachment element of the holster housing. The GND extension path provides an antenna counterpoise for an external antenna of the portable radio when the portable radio is holstered and worn by a user. The holster of the various embodiments advantageously provides the ability to maintain talk range communication range of the portable radio without extending the physical length of the external radio antenna or increasing the size of the portable radio form factor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A holster for a portable radio, comprising:

a holster housing having a GND extension path integrated therein, the GND extension path coupling to a portable radio GND and extending the portable radio GND to a belt attachment element of the holster housing, the GND extension path providing an antenna counterpoise for an external antenna of the portable radio when the portable radio is holstered and worn by a user; and wherein the GND extension path comprises:

a GND contact coupled to a docking portion of the holster housing, the GND contact aligning with the radio GND of the portable radio;

a first conductive element embedded in the holster housing, the first conductive element having first and second ends, the first end of the conductive element being coupled to the GND contact of the holster housing; and a second conductive element embedded in the belt attachment element, the second conductive element being coupled to the second end of the first conductive element.

2. The holster of claim 1, wherein the GND contact of the holster housing is configured to align with one at least one of:

a battery GND contact of the portable radio;

a dedicated GND contact of the portable radio; and a conductive chassis GND of the portable radio that is internally coupled to the portable radio GND.

3. The holster of claim 1, wherein the first conductive element comprises a conductive wire element.

4. The holster of claim 1, wherein the second conductive element comprises a conductive patch element.

5. The holster of claim 1, wherein the belt attachment element has a predetermined thickness for setting a predetermined distance between the second conductive element and a human body when the holster is worn by a user.

6. The holster of claim 1, wherein the second conductive element is embedded within an inner portion of the belt attachment element adjacent to the holster housing.

7. The holster of claim 1, wherein the first conductive element extends into the belt attachment element, and the second conductive element is embedded within an outer portion of the belt attachment element.

8. The holster of claim 1, wherein the portable radio is a portable land mobile radio (LMR) and the external antenna is a quarter wavelength external antenna.

9. The holster of claim 8, wherein the GND extension path is switched on in response to predetermined radio operating parameters comprising at least one of:

receive signal strength detected lower than a predetermined threshold;

location data of the portable radio indicating a communication distance exceeding a communication distance threshold to another radio;

portable radio operating in direct radio to radio mode, without repeater or trunking;

external antenna type insufficient for predetermined communication talk range;

remote speaker microphone (RSM) not connected;

receive mode;

assignment of the portable radio for an incident type that requires longer communication range; and portable radio configured for a pager mode of operation.

10. The holster of claim 1, wherein the GND extension path is controlled by a switch.

11. The holster of claim 10, wherein the switch is located in one of the portable radio or a battery pack of the portable radio.

* * * * *